United States Patent

Ahne et al.

[11] Patent Number: 5,147,961
[45] Date of Patent: Sep. 15, 1992

[54] PREPARATION OF HYDROXYPOLYAMIDES

[75] Inventors: Hellmut Ahne, Roettenbach; Peter Baeuerlein, Schillingsfuerst; Albert Hammerschmidt, Erlangen, all of Fed. Rep. of Germany

[73] Assignee: Siemens Aktiengesellschaft, Berlin & Munich, Fed. Rep. of Germany

[21] Appl. No.: 773,720

[22] Filed: Oct. 9, 1991

Related U.S. Application Data

[62] Division of Ser. No. 501,169, Mar. 29, 1990.

[30] Foreign Application Priority Data

Apr. 6, 1989 [DE] Fed. Rep. of Germany ....... 3911210

[51] Int. Cl.⁵ .............................................. C08G 63/00
[52] U.S. Cl. ..................................... 528/182; 528/21; 528/38; 528/125; 528/170; 528/176; 528/184
[58] Field of Search ............... 528/21, 38, 125, 170, 528/176, 182, 184

[56] References Cited

U.S. PATENT DOCUMENTS

| | | | |
|---|---|---|---|
| 4,339,521 | 7/1982 | Ahne et al. | 430/192 |
| 4,395,482 | 7/1983 | Ahne et al. | 430/326 |
| 4,622,285 | 11/1986 | Ahne | 430/322 |
| 4,849,051 | 7/1989 | Ahne et al. | 156/659.1 |

FOREIGN PATENT DOCUMENTS 3716629 12/1988 Fed. Rep. of Germany .

*Primary Examiner*—Harold D. Anderson
*Assistant Examiner*—Shelley A. Wright
*Attorney, Agent, or Firm*—Kenyon & Kenyon

[57] ABSTRACT

Hydroxypolyamides can be obtained in a simple and economical way in a chloride-free manner when
(a) aromatic amino hydroxy carboxylic acids or
(b) aromatic diaminodihydroxy compounds and aromatic dicarboxylic acids or
(c) aromatic diaminodihydroxy compounds, aromatic dicarboxylic acids and aromatic amino hydroxy carboxylic acids are converted in the presence of 1-ethoxycarbonyl-2-ethoxy-1.2-dihydroquinoline, 1.1'-carbonyldioxy-di-1.2.3-benzotriazole or dicyclohexyl carbodiimide/1-hydroxy-1.2.3-benzotriazole.

6 Claims, No Drawings

PREPARATION OF HYDROXYPOLYAMIDES

This is a division of application Ser. No. 07/501,169 filed Mar. 29, 1990.

FIELD OF THE INVENTION

The invention concerns a method for preparing hydroxypolyamides.

BACKGROUND OF THE INVENTION

Hydroxypolyamides serve as soluble oligomeric and/or polymeric polybenzoxazole precursors in thermoresistant photoresists for producing heat resistant relief structures; i.e., for the economical direct structuring of organic insulating layers. In addition to a high thermal load capacity (>450° C.) and very good electrial characteristic values, a very high purity is also required of insulating materials which remain in microelectronic components. Thus, the concentration of e.g. chloride ions should lie distinctly below 3 ppm. This is because chloride ions impair the electrical properties of the components and they can negatively influence the long-term stability of the components through corrosion processes.

Soluble, and therefore having good workability, polybenzoxazole precursors in the form of hydroxypolyamides which are converted into high-temperature-resistant polybenzoxazoles by means of a temperature treatment, are known from e.g. EP-PS 0 023 662, EP-OS 0 291 779 and DE-OS 37 16 629. These polybenzoxazole precursors are prepared starting from aromatic diaminodihydroxy compounds and aromatic dicarboxylic acid chlorides. In order to reach the low degree of ionic impurities required in microelectronic engineering, it is usually necessary to perform extensive purifying operations by means of ion exchangers. Such purifying operations involve labor- and cost-intensive processes. Another drawback of such purifying operations is that organic impurities, e.g. amines stemming from anion exchangers, can get into the resinous matter and negatively influence the properties of the resinous matter.

A chloride-free synthesis of polybenzoxazole precursors is known from EP-OS 0 158 726. In this connection, diaminodihydroxy compounds are caused to react with dicarboxylic acids in the presence of a carbodiimide. During this conversion, though, carbamide residues, which remain due to a rearrangement reaction on the resin, cause difficulties. Namely, these residues impair the thermal resistance of the polybenzoxazole precursors and the constitution of layers made out of them.

Accordingly, it is an object of the invention to specify a simple and economical method for preparing hydroxypolyamides in a chloride-free manner.

SUMMARY OF THE INVENTION

The invention provides a method for preparing hydroxypolyamides wherein
(a) aromatic amino hydroxy carboxylic acids or
(b) aromatic diaminodihydroxy compounds and aromatic dicarboxylic acids or
(c) aromatic diaminodihydroxy compounds, aromatic dicarboxylic acids and aromatic amino hydroxy carboxylic acids are converted in the presence of 1-ethoxycarbonyl-2-ethoxy-1.2-dihydroquinoline, 1.1'-carbonyldioxy-di-1.2.3-benzotriazole or dicyclohexyl carbodiimide/1-hydroxy-1.2.3-benzotriazole into compounds of the following structure:

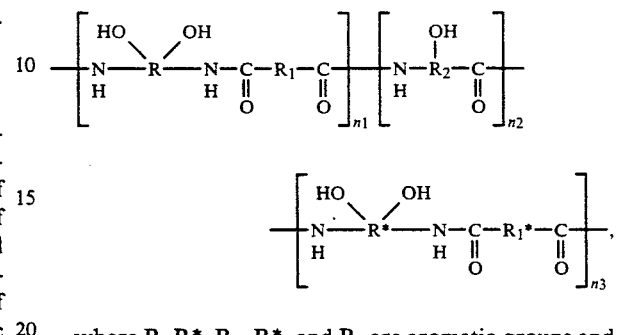

where $R$, $R^*$, $R_1$, $R^*_1$ and $R_2$ are aromatic groups and regarding $n_1$, $n_2$ and $n_3$, the following holds:

$n_1$ and $n_2 = 1$ to 100, $n_3 = 0$ or $n_2 = 1$ to 100, $n_1$ and $n_3 = 0$ or $n_1$, $n_2$ and $n_3 = 1$ to 100 (with $R \neq R^*$ and/or $R_1 \neq R^*_1$) or $n_1$ and $n_3 = 1$ to 100, $n_2 = 0$ (with $R \neq R^*$ and/or $R_1 \neq R^*_1$).

DETAILED DESCRIPTION OF THE INVENTION

The method according to the invention, in which special reagents are used for the condensation reaction between amino groups and carboxyl groups, supplies the desired polybenzoxazole precursors in good yield. This is shown by spectroscopic analyses such as IR [infrared] and NMR [nuclear magnetic resonance] measurements. This fact, however, was very surprising for the following reason. In the organic synthesis and in peptide chemistry, a series of reagents have been developed which permit special esterifications, e.g. of sterically hindered alcohols, and the linking of peptide bonds, among them 1-ethoxycarbonyl-2-ethoxy-1.2-dihydroquinoline and 1.1'-carbonyldioxy-di-1.2.3-benzotriazole. As such spectroscopic analyses have shown, these reagents do not, however, result in the desired polymer precursors with the exception of those which are used in the method according to the invention.

In the method according to the invention for preparing hydroxypolyamides the preparation can start with the appropriate carboxylic acids in place of acid chlorides. Therefore, purification steps, in particular those using ion exchangers, can be dispensed with so that a simple and economical synthesis is made possible.

In the method according to the invention, the reaction between the amino functional hydroxy compounds and the carboxylic acids is advantageously carried out in an organic solvent. Preferably, N-methylpyrrolidone and/or pyridine is used as a solvent. The conversion itself advantageously takes place at temperatures from room temperature to approximately 60° C.

The hydroxypolyamides prepared according to the method of the invention preferably possess aromatic groups of the following structure. R and R* can have the following significance:

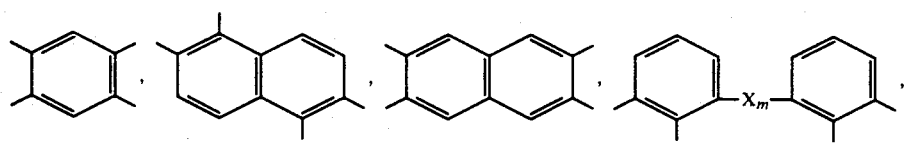

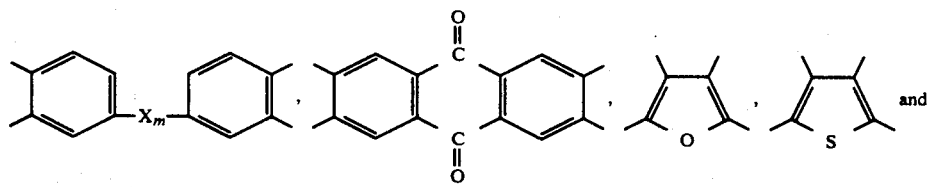

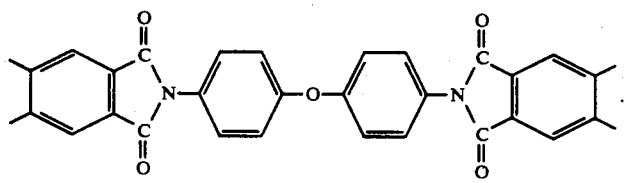

$R_1$ and $R^*_1$ can have the following significance, where H-atoms can also be substituted by Cl or Br:

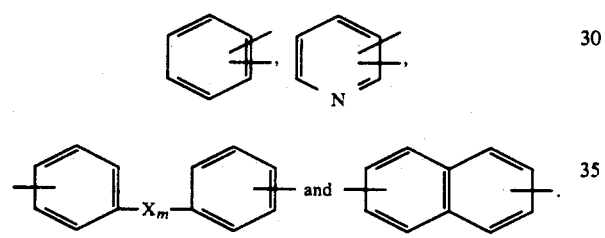

$R_2$ can have the following significance:

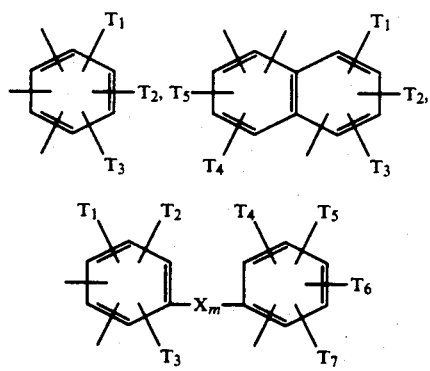

Thereby, $T_1$ to $T_7$ signify H or alkyl, $m = 0$ or 1, and X signifies:

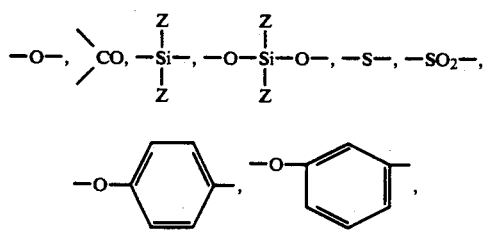

-continued

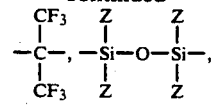

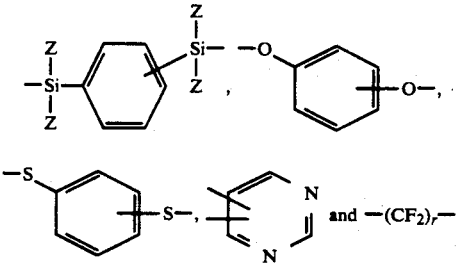

Thereby the following holds:
Z = alkyl with 1 to 10 carbon atoms or aryl, and
r = 2 to 18.

The invention shall be more closely explained in light of the exemplified embodiments.

EXAMPLE 1

Conversion of Isophthalic Acid using 3.3'-dihydroxy benzidine 8.32 parts by weight 1-ethoxycarbonyl-2-ethoxy-1.2-dihydroquinoline and 2.79 parts by weight isophthalic acid, dissolved in 15 parts by weight N-methylpyrrolidone, are mixed in a 250 ml three neck flask provided with an agitator, a dropping funnel and a drying tube for 75 minutes at room temperature under an argon atmosphere. Next, a solution of 3.64 parts by weight 3.3'-dihydroxy benzidine in 30 parts by weight N-methylpyrrolidone is added drop by drop and is subsequently mixed for 6 hours at room temperature; then the solution is left to stand for another 12 hours at room temperature. To isolate the resin, the reaction mixture is poured into 500 parts by weight methanol; then it is washed repeatedly with the precipitating agent and is subsequently dried in vacuum (at a pressure of approx. 270 mbar) at room temperature over $CaCl_2$ and NaOH; yield: 3.6 parts by weight (62% of theory). The viscosity number amounts to 12.5 ml/g (1% solution in N-methylpyrrolidone at 23° C.).

EXAMPLE 2

Conversion of Isophthalic Acid using 3.3'-dihydroxy benzidine and 3.3'-diamino-4.4'-dihydroxydiphenyl-1.1.1.3.3.3-hexafluoro propane 50 parts by weight 1-ethoxycarbonyl-2-ethoxy-1.2-dihydroquinoline and 16.8 parts by weight isophthalic acid, dissolved in 90 parts by weight N-methylpyrrolidone, are mixed for 45 minutes at room temperature under an argon atmosphere in a 1 l-three neck flask provided with an agitator, a reflux condensor, a dropping funnel and a drying tube. Next, this is heated to 50° C. and a solution of 10.94 parts by weight 3.3'-dihydroxy benzidine and 17.48 parts by weight 3.3'-diamino-4.4'-dihydroxydiphenyl-1.1.1.3.3.3-hexafluoropropane in 150 parts by weight N-methylpyrrolidone is added drop by drop. Subsequently, the solution is mixed for 5 hours at 50° C. and then is left to stand for another 12 hours at room temperature. The resin is isolated by precipitation in 4000 parts by weight of a mixture of water and methanol (ratio 2:1) and subsequent suctioning off; then [it] is washed repeatedly with water and is subsequently dried in vacuum (at a pressure of approx. 270 mbar) at room temperature over NaOH; yield: 26.6 parts by weight (63% of theory). The viscosity number amounts to 8.7 ml/g (1% solution in N-methylpyrrolidone at 23° C.).

EXAMPLE 3

Conversion of Isophthalic Acid Using 3.3'-dihydroxy benzidine 10.06 parts by weight 1.1'-carbonyldioxy-di-1.2.3-benzotriazole, 2.65 parts by weight pyridine and 2.82 parts by weight isophthalic acid in 15 parts by weight N-methylpyrrolidone are introduced under an argon atomosphere into a 250 ml three neck flask provided with an agitator, a reflux condensor, a dropping funnel and a drying tube. A $CO_2$ development immediately commences, which ends after approximately 5 minutes. The mixture is then mixed for 20 minutes at room temperature, is subsequently heated to 60° C., and a solution of 3.68 parts by weight 3.3'-dihydroxy benzidine in 25 parts by weight N-methylpyrrolidone is added drop by drop. Then the solution is mixed for 4 hours at 60° C. and is subsequently left to stand for another 12 hours at room temperature. The resin is precipitated in 1100 parts by weight methanol, the precipate is suctioned off, washed repeatedly with methanol and is dried over NaOH at room temperature; yield: 4.5 parts by weight (77% of theory). The viscosity number amounts to 23.7 ml/g (1% solution in N-Methylpyrrolidone at 23° C.).

EXAMPLE 4

Conversion of Isophthalic Acid Using 3.3'-dihydroxy benzidine 5.67 parts by weight dicyclohexyl carbodiimide together with 5.4 parts by weight 1-hydroxy-1.2.3-benzotriazole are dissolved in 30 parts by weight N-methylpyrrolidone. A solution of 2.08 parts by weight isophthalic acid in 30 parts by weight N-methylpyrrolidone is added drop by drop to this mixture while being stirred, and is subsequently mixed for 30 minutes. Then 2.7 parts by weight 3.3'-dihydroxy benzidine is added drop by drop while being stirred; is subsequently mixed for 2 hours and the precipitated dicyclohexyl-carbamide is filtered off from the reaction solution. The filtrate is added by drops into 600 parts by weight ice water while being stirred; the precipitated solid is suctioned off, washed repeatedly with water and is subsequently dried in the vacuum-drying oven (at a pressure of approx. 270 mbar) over NaOH; yield: 4.3 parts by weight (90% of theory). The viscosity number amounts to 13.27 ml/g (1% solution in N-methylpyrrolidone at 23° C.).

What is claimed is:

1. A method for preparing hydroxypolyamides having the following structure:

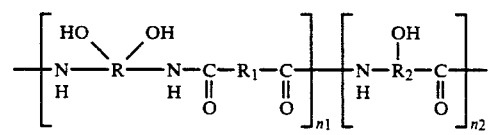

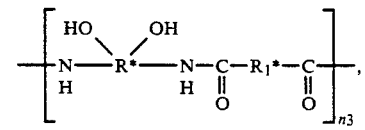

where R, R*, $R_1$, R*$_1$ and $R_2$ are aromatic groups and where:

$n_1$ and $n_2 = 1$ to 100, $n_3 = 0$ or $n_2 = 1$ to 100, $n_1$ and $n_3 = 0$ or $n_1$, $n_2$ and $n_3 = 1$ to 100, where at least one of the following holds: R is other than R*, and $R_1$ is other than R*$_1$, or $n_1$ and $n_3 = 1$ to 100, $n_2 = 0$, where at least one of the following holds: R is other than R*, and $R_1$ is other than R*$_1$, comprising the step of reacting one of:

(a) at least one aromatic amino hydroxy carboxylic acid, or (b) at least one aromatic diaminodihydroxy compound, at least one aromatic dicarboxylic acid and at least one aromatic amino hydroxy carboxylic acid, in the presence of 1-ethoxycarbonyl-2-ethoxy-1,2-dihydroquinoline, 1,1'-carbonyldioxy-di-1,2,3-benzotriazole or dicyclohexyl carbodiimide/1-hydroxy-1,2,3-benzotriazole.

2. The method according to claim 1 wherein the reaction occurs in an organic solvent.

3. The method according to claim 2 wherein the solvent is at least one of N-methylpyrrolidone and pyridine.

4. The method according to claim 1 wherein the temperature during the reaction is set at room temperature to approximately 60° C.

5. The method according to claim 3 wherein the temperature during the reaction is set at room temperature to approximately 60° C.

6. The method according to claim 3 wherein the temperature during the reaction is set at room temperature to approximately 60° C.

* * * * *